United States Patent
Flamini et al.

(10) Patent No.: US 7,482,529 B1
(45) Date of Patent: Jan. 27, 2009

(54) SELF-ADJUSTING MUSIC SCROLLING SYSTEM

(75) Inventors: Elisabetta Flamini, Eastleigh (GB);
Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/100,125

(22) Filed: Apr. 9, 2008

(51) Int. Cl.
*G10H 7/00* (2006.01)
*A63H 5/00* (2006.01)
*G04B 13/00* (2006.01)

(52) U.S. Cl. .............................. 84/645; 84/616; 84/609

(58) Field of Classification Search ................... 84/609, 84/616, 645
See application file for complete search history.

(56) References Cited

U.S. PATENT DOCUMENTS

| | | | |
|---|---|---|---|
| 4,779,510 | A | 10/1988 | Van den Abbeel |
| 5,760,323 | A | 6/1998 | Romero et al. |
| 6,365,819 | B2 * | 4/2002 | Yamada ........................ 84/609 |
| 6,392,132 | B2 | 5/2002 | Uehara |
| 7,064,261 | B2 | 6/2006 | Shao |
| 7,189,912 | B2 * | 3/2007 | Jung ............................ 84/610 |
| 2001/0037719 | A1 | 11/2001 | Gardner et al. |
| 2002/0011143 | A1 | 1/2002 | Uehara |
| 2006/0288842 | A1 | 12/2006 | Sitrick et al. |
| 2007/0113728 | A1 * | 5/2007 | Weir ............................ 84/645 |
| 2007/0119292 | A1 | 5/2007 | Nakamura |

FOREIGN PATENT DOCUMENTS

JP      01277893       11/1989

OTHER PUBLICATIONS

WIDI Recognition System 3.3 <http://www.widisoft.com/english/products.html>; viewed Apr. 8, 2008.
GNMIDI—MIDI Tools for Windows <http://www.gnmidi.com>; viewed on Apr. 8, 2008.
Speech Recognition <http://en.wikipedia.org/wiki/Speech_recognition#Hidden_Markov_model_28HMM.29-based_speech_recognition>; viewed on Apr. 8, 2008.

(Continued)

*Primary Examiner*—Jeffrey Donels
(74) *Attorney, Agent, or Firm*—Oppenheimer Wolff & Donnelly LLP; Adam P. Kiedrowski

(57) ABSTRACT

A self-adjusting music scrolling method comprises providing a display screen, selecting a music score to be played by a musician, wherein the music score is cataloged and stored in a music score database as a first MIDI file, displaying a first portion of the selected music score on the display screen, recording musical notes played by a musician with a digital device, storing the recorded musical notes in memory as a WAV file, converting the WAV file into a second MIDI file, comparing the first MIDI file and the second MIDI file with a MIDI comparison algorithm, determining if the first MIDI file substantially matches the second MIDI file, automatically adjusting the music score on the display screen to show a second portion of the selected music score upon determining that the first MIDI file substantially matches the second MIDI file, and displaying one or more mistakes detected on the display screen upon determining that the first MIDI file does not substantially match the second MIDI file.

1 Claim, 2 Drawing Sheets

OTHER PUBLICATIONS

IBM—Embedded ViaVoice <http://www-306.ibm.com/software/pervasive/embedded_viavoice/>; viewed on Apr. 8, 2008.

Podcast Autocue—User Tutorial TOC http://www.podcastautocue.com/help/#_Toc114599673; viewed on Apr. 8, 2008.

Differentiated Harmonic Feature Analysis on Music Information Retrieval For Instrument Recognition <http://www.mir.uncc.edu/docs/papers/06_Differentiated%20Harmonic%20Feature%20Analysis%20on%20Music%20Information%20Retrieval%20For%20Instrument%20Recognition.pdf>; viewed on Apr. 8, 2008.

The Guide to Computing Literature <http://portal.acm.org/citation.cfm?id=1265605.1265715&coll=GUIDE&di=GUIDE&CFID=15151515&CFTOKEN=6184618>; viewed on Apr. 8, 2008.

Shazam Experience Music <http://www.shazam.com/music/portal/sp/s/media-type/html/user/anon/page/default/template/pages/p/company_product.html>; viewed on Apr. 8, 2008.

OMARS: Online Music Recognition and Searching <http://www.elec.qmul.ac.uk/research/projects/nsf_9905842_omras.html>; viewed on Apr. 8, 2008.

Audio to MIDI Programs <http://www.music-notation.info/en/compmus/audio2midi.html>; viewed on Apr. 8, 2008.

Music Recognition-Wav to MIDI Conversion (WAV2Midi) <http://www.akoff.com/about.html>; viewed on Apr. 8, 2008.

WAV to MIDI conversion and music transcription software—Solo Explorer <http://www.recognisoft.com/>; viewed on Apr. 8, 2008.

Digital Ear: Real-time Wave to MIDI converter <http://www.digital-ear.com/digital-ear/index.asp>; viewed on Apr. 8, 2008.

Music Notation <http://www.music-notation.info/en/compmus/notationformats.html>; viewed on Apr. 8, 2008.

MIDI Transmognifier http://www.cap-lore.com/EnglishSuites/code/Transmog/index.html#compare; viewed on Apr. 8, 2008.

Wav to midi conversion software—Solo Explorer <http://www.recognisoft.com/>; viewed on Apr. 8, 2008.

MIDI Organizer and Search <http://www.fredparcells.com/MIDI%20Organizer%20Search%20Readme.htm>; viewed on Apr. 8, 2008.

GNMIDI—MIDI Tools for Windows <http://www.gnmidi.com/>; viewed on Apr. 8, 2008.

* cited by examiner

SELF-ADJUSTING MUSIC SCROLLING SYSTEM

FIELD OF THE INVENTION

The present invention relates in general to the display of words or music notes, and more particularly, to an automatic scrolling system and method of adjusting a music score shown on a display based upon recognition of the music notes or words already played or sung by a musician.

BACKGROUND OF THE INVENTION

Previous systems and methods have attempted to provide electronic music displays as an alternative to requiring musicians to manually turn pages. However, such solutions have not conquered the many obstacles that exist in providing electronic music displays because, for example, they require manual intervention, either directly to activate the scrolling or as a consequence of mistakes made by the musician (i.e., playing the wrong note).

More particularly, existing solutions are generally not automatic and/or are not synchronized with the execution of music notes played by the musician. These solutions exempt the musician from undertaking manual actions in only very limited circumstances. For example, in one existing system designed for use by an orchestra, a cursor is displayed on a screen containing sheet music in order to indicate the current beat set by the director. However, if the director makes a mistake, the musician is then forced to determine for himself what the correct position of the cursor should be. In another existing system, the musician may activate the scrolling of music on a display by using his or her foot. However, for obvious reasons, this type of system may not be used in conjunction with instruments that are played, at least in part, with the feet (e.g. a piano or an organ). In yet another existing system, automatic time-based scrolling is used to scroll the music notes on a display based upon a predetermined time interval. However, the automatic scrolling solution utilizing a customizable time interval is often times inaccurate, thereby scrolling either ahead of or behind time and disrupting the musician's ability to play the proper notes at the proper tempo.

Furthermore, existing solutions do not adequately take into account the fact that reading "sheet" music is not always sequential like reading a book. For example, when reading sheet music, sets of beats may be repeated and may terminate differently at any repetition. Furthermore, under certain circumstances, there may be "jumps" from one page to another page.

Based on the foregoing, there exists a need for an improved system and method for automatically scrolling music on a display based upon recognition of the music notes previously played or sung by a musician.

BRIEF SUMMARY OF THE INVENTION

The present invention solves the foregoing problems by providing a self-adjusting music scrolling method comprising providing a display screen, selecting a music score to be played by a musician, wherein the music score is cataloged and stored in a music score database as a first MIDI file, displaying a first portion of the selected music score on the display screen, recording musical notes played by a musician with a digital device, storing the recorded musical notes in memory as a WAV file, converting the WAV file into a second MIDI file, comparing the first MIDI file and the second MIDI file with a MIDI comparison algorithm, determining if the first MIDI file substantially matches the second MIDI file, automatically adjusting the music score on the display screen to show a second portion of the selected music score upon determining that the first MIDI file substantially matches the second MIDI file, and displaying one or more mistakes detected on the display screen upon determining that the first MIDI file does not substantially match the second MIDI file. The musical notes played by the musician may be played on any type of instrument, including both acoustic and electronic instruments. The comparison algorithm compares both pitch and duration parameters of musical notes in order to determine if the first MIDI file substantially matches the second MIDI file.

DETAILED DESCRIPTION OF THE INVENTION

The present invention includes an automatic music scrolling system and method capable of adjusting a music score or notes shown on a display screen based upon recognition of the music notes already played or sung by a musician. In particular, one exemplary embodiment of the present invention is designed to both recognize the instrument timbre as well as the music played. The invention generally combines music recognition with an electronic music display that visually depicts the real-time position in the music score. Thus, the automatic scrolling system and method recognizes the notes already played, tracks the performance on the displayed music score, and advances the music score on the screen accordingly and without the need for intervention by the musician.

In accordance with the present invention, the musician may be able to select the type of scrolling suitable for him, such as by beats, lines or pages. Additionally, with regard to page scrolling the musician may be able to select when the system scrolls to the next page. For example, the musician may select the number of beats remaining on a page before the system scrolls to the next page. With regard to line and beat scrolling, the musician may choose the fixed position of the current line or beat. The musician may also select that a preview of the next beats/lines/pages be shown on a portion of the screen to help the musician visualize the notes that will be coming up shortly. It is important to note that it is not necessary for the automatic scrolling system of the present invention to always scroll sequentially. For example, the system may be configured such that it may automatically jump pages, in either direction, as required by the music score.

Figure 1:
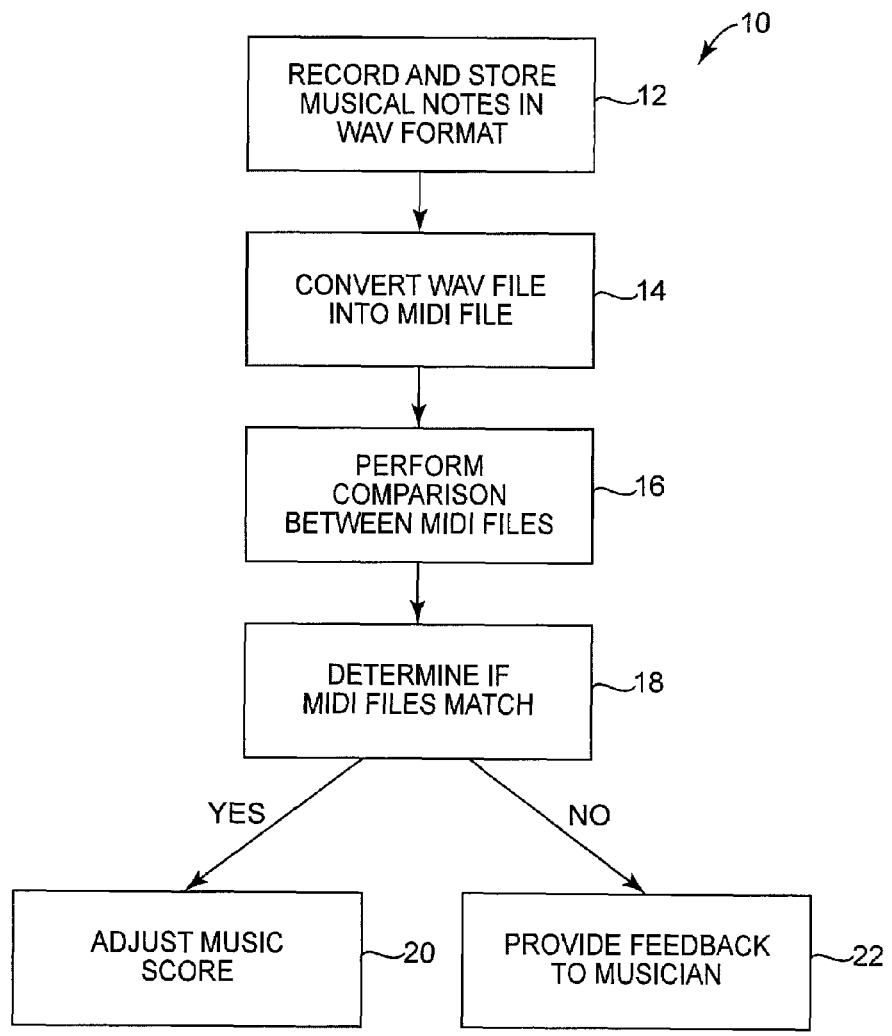
FIG. 1 is a flowchart illustrating one embodiment of an automatic music scrolling method in accordance with the present invention.

FIG. 1 is a flowchart illustrating one exemplary embodiment of a method 10 for providing automatic scrolling of a previously selected music score. The method begins at step 12 where the musical notes played by a musician are recorded and stored in memory by a digital device in WAV format. The recording of the musical notes played by the musician may be accomplished using any one of a variety of commercially available WAV recording devices, as will be appreciated by those skilled in the art.

The method continues at step 14 where the WAV file recorded and stored in step 12 is converted into a MIDI file.

The conversion between a WAV and a MIDI file in step 14 may be performed by any one of a variety of WAV to MIDI programs as will be appreciated by those skilled in the art. For example, one type of solution that may be used for the WAV to MIDI conversion of step 14 is a software program that uses an algorithm configured to take a sound signal as it is input and attempts to capture the loudness, pitch, dynamics, and performance style present in the sound signal. All of these features captured by the program are then written into a MIDI file. When replayed, this MIDI file will sound very similar to the original sound signals input into the converter. Another solution that may be used for the WAV to MIDI conversion of step 14 includes a real-time WAV to MIDI converter that is capable of analyzing a live or recorded solo performance (such as a singing voice or a musical instrument) and converting the corresponding sound signals into a standard MIDI file. This type of software program may not only be capable of reading standard WAV audio files, but also may accept live microphone input.

The method continues at step 16 where the MIDI file created in step 14 is compared to a MIDI file corresponding to the music score previously selected by the musician, which may be cataloged in and accessed from a music repository database. The music repository database preferably stores the music scores in MIDI format, although those skilled in the art will appreciate that the music scores may be stored in another format, such as in WAV format, and later converted into a MIDI file such as with the WAV to MIDI programs previously described. The comparison between the MIDI file corresponding to the music notes recorded in step 12 and the MIDI file corresponding to the predetermined music score stored in the music repository database may be based on the events constituting the MIDI format without the need to focus on all aspects of the event. For example, the comparison may be performed based on pitch (either relative or absolute) and/or the duration of the event. In one embodiment, the comparison algorithm may place a greater weighting on the duration of the music notes rather than on their pitch.

Next, in step 18, a determination is made whether or not the MIDI file corresponding to the music notes recorded in step 12 substantially match the MIDI file corresponding to the pre-selected music score. Step 18 preferably incorporates an "error allowance" that may be selected by the musician, thus providing the musician with the power to select the degree of a "mistake" that is considered acceptable. In general, a mistake may be one or more consecutive incorrect notes played by the musician. In case of a mistake within the allowance limit set by the musician, the automatic scrolling will continue tracking the performance of the musician ignoring the incorrect notes. However, when the mistake is above the allowance limit a mechanism of matching the next played beats with the music will take place and will re-synchronize the musician's performance to the music score. The musician may have the opportunity to select the search range of the re-synchronization mechanism, for example in the same piece, a selected range of pieces, the same page, etc.

The definition of an error tolerance is needed because, after a mistake, the musician could stop and restart the performance from another point, either prior to or after the beat of the mistake. The possibility of modulating the allowance level will permit the musician to adjust the synchronization mechanism to the ability of the musician in performing the piece. The mechanism of matching played beats with music may also exempt the musician from having to select the piece before starting to play. For example, the musician could simply start to play the first beats, which may thereafter be automatically synchronized to the right piece at the right beat.

If it is determined in step 18 that the MIDI file corresponding to the music notes recorded in step 12 substantially match the MIDI file corresponding to the pre-selected music score, then the method continues at step 20 where the music score shown on the display is automatically scrolled so that the musician may continue playing without any interruption.

Alternatively, if it is determined in step 18 that the MIDI file corresponding to the musical notes recorded in step 12 do not substantially match the MIDI file corresponding to the pre-selected musical score, then the method continues at step 22 where the user is provided with feedback regarding the mistakes detected in the comparison step.

In a musical group, the synchronization in accordance with the present invention may also happen as a result of musical notes being played by other musicians. In particular, the music scrolling systems of the group may be connected and always synchronized, delegating the scrolling task to only one instrument or by necessity, one scrolling system may be temporarily synchronized to another.

The tolerance of the music scrolling system in accordance with the present invention may largely depend on the tolerance of all the involved algorithms. For example, in the system and method previously described, the errors produced by the music recording and MIDI comparison steps are usually negligible when compared to the errors that may be produced by the WAV to MIDI conversion step.

More particularly, the main source of error in the WAV to MIDI step is due to the fact that several harmonics played by an instrument may be associated with the same note. This type of error may greatly affect the transposition of played music into music notation. However, it will not generally impact an automatic scrolling system in the same manner because in such a system, the pitch of notes is not the only parameter that may be relied upon. For example, another parameter that may be used is duration. Thus, the scrolling system and method of the present invention may be set up based only on the pitch recognition, thereby introducing a larger source of error. Alternatively, the scrolling system and method of the present invention may be set up based on the duration of the notes, thereby minimizing the potential errors. However, it may be desirable to use a combination of both of the methods in order to reduce the potential errors by a considerable amount.

The system and method of the present invention has been described above with reference to musical notes generated by a musician playing an instrument. However, the present invention may also be extended to words spoken or sung by an individual, which may then be compared to a script, music lyrics, or the like.

Figure 2:
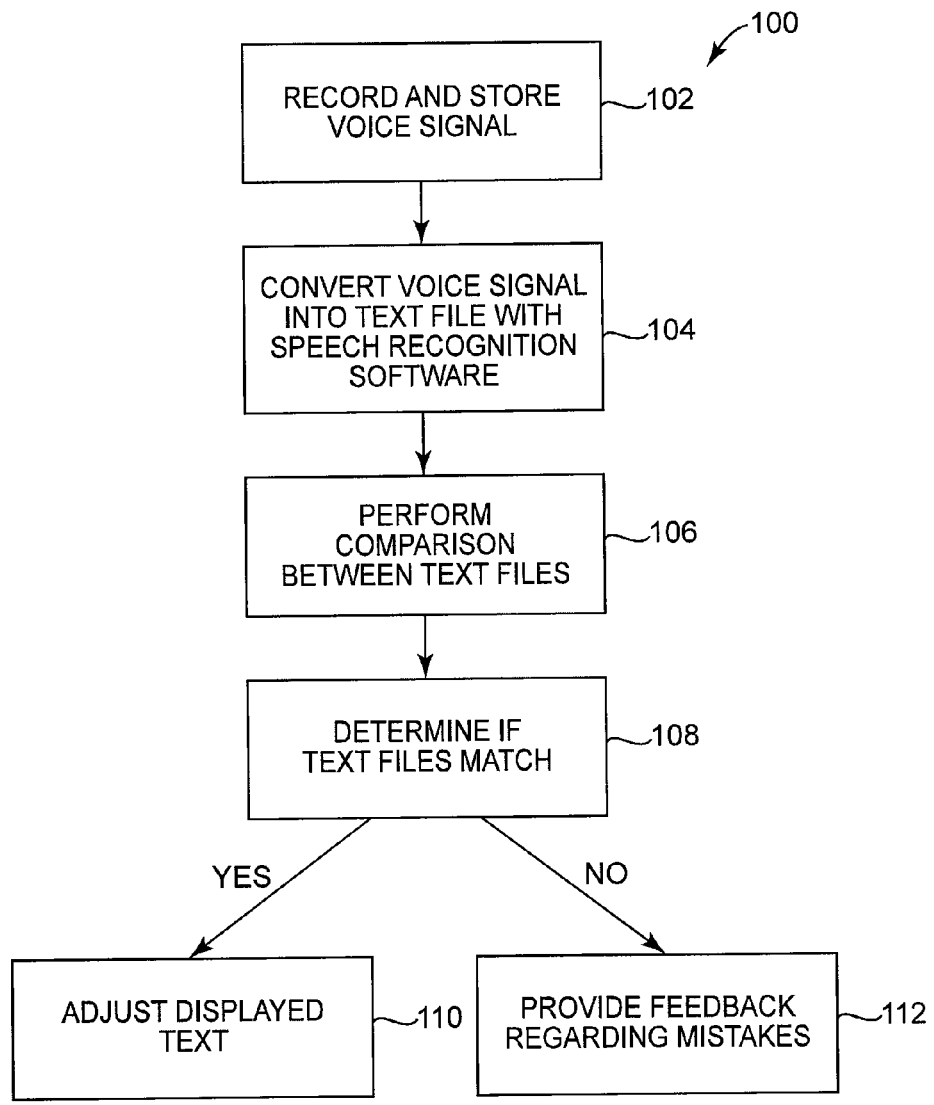
FIG. 2 is a flowchart illustrating an alternative embodiment of an automatic scrolling system and method in accordance with the present invention that utilizes speech recognition.

FIG. 2 is a flowchart illustrating one exemplary embodiment of a method 100 for providing automatic scrolling based on speech recognition. The method operates similar to method 10 previously described, and thus, will be discussed only briefly. The method begins at step 102 where the voice signals from words spoken or sung by an individual are recorded and stored in memory. The method continues at step 104 where the voice signals recorded and stored in step 102 are converted into a text file with speech recognition software. Then, in step 106, the text file created in step 104 is compared to a text file corresponding to a script or music lyrics previously selected by the individual. Next, in step 108, a determination is made whether or not the text file corresponding to the words recorded in step 102 substantially matches the text file corresponding to the pre-selected script or music lyrics. If it is determined in step 108 that the text file corresponding to the words recorded in step 102 substantially matches the text file corresponding to the pre-selected script or music lyrics, then the method continues at step 110 where the text shown on the display is automatically scrolled accordingly. Alternatively, if it is determined in step 108 that the text file corresponding to the words recorded in step 102 do not substantially match the text file corresponding to the pre-selected script or music lyrics, then the method continues at step 112 where the user is provided with feedback regarding the mistakes detected in the comparison step. As will be appreciated by those skilled in the art, method 100 may be adapted for use with numerous other speech-type applications without departing from the intended scope of the present invention.

One exemplary speech recognition method that may be used in conjunction with the present invention is the Hidden Markov Model (HMM). The HMM speech recognition method is a statistical model which treats the voice as a signal. Generally speaking, HMM receives a voice signal as an input and produces an output that typically includes a representation (in plain text) of the recognized word or set of words.

Although the present invention has been described with reference to preferred embodiments, workers skilled in the art will recognize that changes may be made in form and detail without departing from the spirit and scope of the invention.

What is claimed is:

1. A self-adjusting music scrolling method comprising:

providing a display screen;

selecting a music score to be played by a musician, wherein the music score is cataloged and stored in a music score database as a first MIDI file;

defining an acceptable musician error, wherein the acceptable musician error is a configurable parameter selected by the musician, and wherein the acceptable musician error may be defined as the occurrence of one or more consecutive incorrect musical notes played by the musician;

displaying a first portion of the selected music score on the display screen;

recording musical notes played by the musician with a digital device;

storing the recorded musical notes in memory as a WAV file;

converting the WAV file into a second MIDI file;

comparing the first MIDI file and the second MIDI file with a MIDI comparison algorithm, wherein the comparison algorithm compares both pitch and duration parameters of musical notes;

determining if the first MIDI file substantially matches the second MIDI file;

executing an error monitoring sequence to determine if a mistake in the musical notes played by the musician exceeds the acceptable musician error selected by the musician;

automatically adjusting the music score on the display screen to show a second portion of the selected music score upon determining that the first MIDI file substantially matches the second MIDI file; and re-synchronizing a position of the musician within the selected music score upon detecting a mistake that exceeds the acceptable musician error defined by the musician, wherein re-synchronizing includes monitoring a string of correct musical notes played after the mistake is detected and matching the string of correct musical notes with a corresponding string of musical notes in the selected music score.

\* \* \* \* \*